United States Patent Office 2,864,827
Patented Dec. 16, 1958

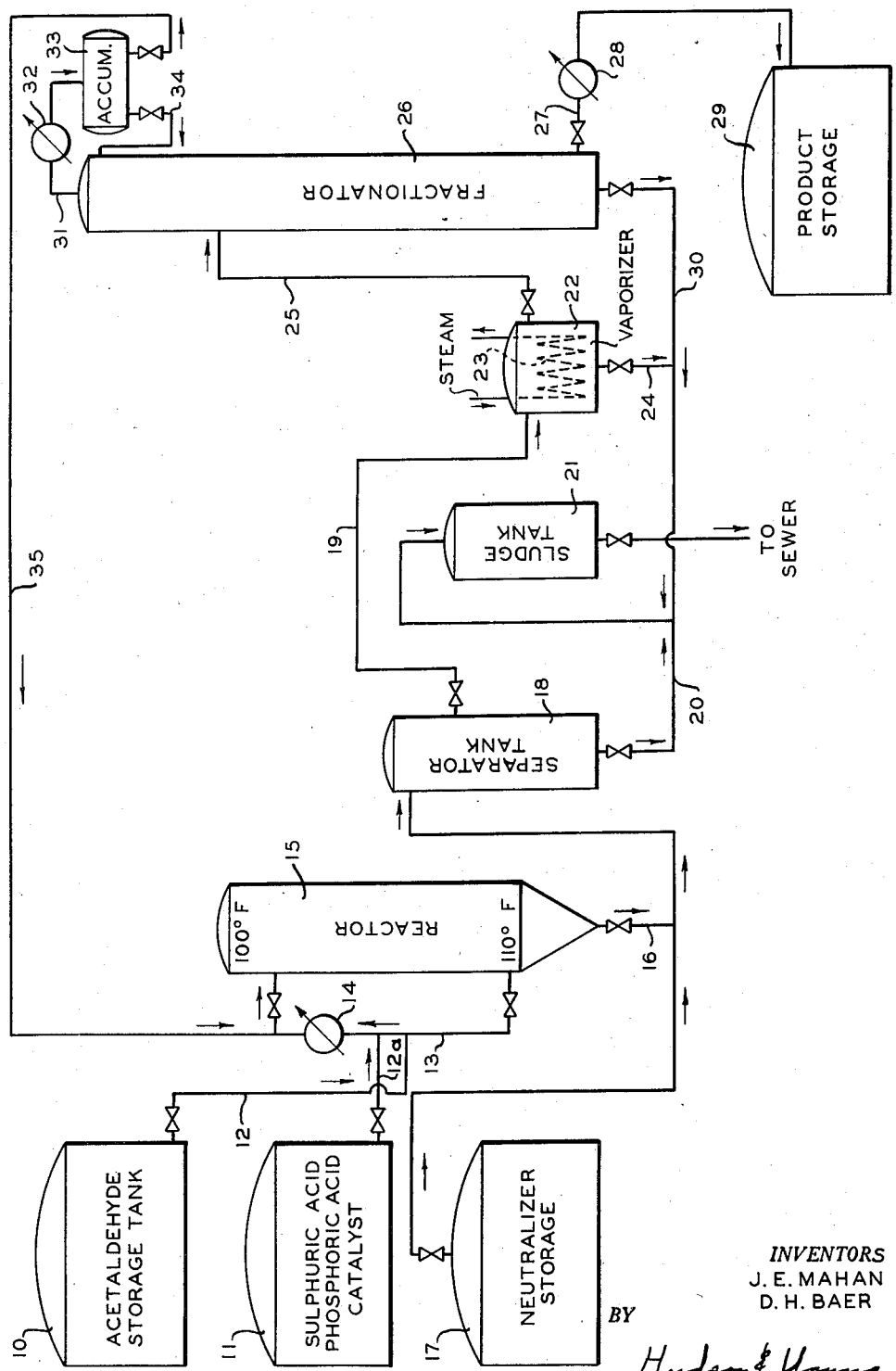

2,864,827

PROCESS FOR POLYMERIZING ALDEHYDES

Donald H. Baer, Los Angeles, Calif., and John E. Mahan, Bartlesville, Okla., assignors to Phillips Petroleum Company, a corporation of Delaware Application November 15, 1954, Serial No. 468,874

7 Claims. (Cl. 260—340)

This invention relates to a process for polymerizing aldehydes.

Heretofore, aldehydes have been catalytically converted to polymeric materials, usually trimers, with an acid catalyst. When a material, such as sulfuric acid, is used as catalyst, a rapid conversion of the aldehyde takes place but a large amount of tarry material is formed which tends to pollute the polymeric product, plug the process lines, and cause other operating difficulties. Where a weaker acid, such as phosphoric acid, is used as catalyst, less tarry material is produced but the reaction rate is too slow for satisfactory operation on a commercial scale.

We have discovered that the polymerization of aldehydes can be carried on at a rapid rate without the formation of excessive tarry by-products by utilizing a mixed catalyst composed of sulfuric acid and phosphoric acid. Surprisingly when operating with this catalyst, the rapid reaction rates possible with sulfuric acid are retained and, yet, the formation of undesirable by-products is greatly minimized.

Accordingly, it is an object of our invention to provide an improved catalyst for the polymerization of aldehydes.

It is a further object to provide a catalyst which will effect polymerization of aldehydes at a rapid rate without the formation of excessive amounts of tarry products.

Various other objects, advantages and features of the invention will become apparent from the following detailed description taken in conjunction with the accompanying drawings, in which:

The figure is a flow diagram illustrating the process of this invention.

Referring now to the drawing in detail, acetaldehyde or other aldehyde to be converted is stored in a tank 10. While the catalyst of this invention is particularly suitable for the commercial production of paraldehyde from acetaldehyde and is described as such, it is broadly applicable to polymerizable aldehydes, specifically aliphatic aldehydes having two to seven carbon atoms, such as propionaldehyde, or n-heptaldehyde.

The mixed acid catalyst is maintained in a storage tank 11, and is composed of sulfuric acid and phosphoric acid. The improved results attributable to the catalyst of this invention are most apparent where the ratio by weight of sulfuric acid to phosphoric acid varies from 2 : 1 to 1 : 2 based on 98% sulfuric acid and 85% phosphoric acid. This results in a color index at the point of acid injection, as measured on the Gardner Varnish Scale, of 13 or less, due to the formation of tarry products, as compared to a color index of 15 to 18 where sulfuric acid is employed as the sole catalyst. In commercial operation, this ratio is maintained between the values of 1 : 1 to 1 : 2, resulting in a color index, as measured on the Gardner Varnish Scale, or 3 or less.

The aldehyde and catalyst are charged through lines 12 and 12a, respectively, in such proportions as to maintain the weight percent of sulfuric acid in the catalyst, based on the fresh aldehyde feed, within the range of 0.05 to 1.0%. In commercial operation, from considerations of economy, rapidity of conversion, and color specification, sulfuric acid weight percentage should vary between 0.05 and 0.2%.

The mixture of catalyst and aldehyde passes from the lines 12 and 12a to a conduit 13 through which flows a circulating stream in a path including a cooler 14 and a reactor 15. The cooler 14 withdraws the heat of the exothermic polymerization reaction so as to maintain a desired temperature within the range of 32 to 140° F. in the polymerization zone. For commercial operations, the temperature is maintained within the range of 100 to 120° F.

In commercial operations with a sulfuric acid catalyst, substantial difficulties were encountered due to plugging of the line 12a, which was a ¼ inch pipe, at its connection to conduit 13, which was a 3-inch pipe. At this junction, there was, in effect, a contact zone between bodies of sulfuric acid and aldehyde material.

In accordance with the invention, these plugging difficulties are eliminated or substantially minimized by utilizing a mixed sulfuric acid-phosphoric acid catalyst in a weight ratio of 1 : 1 to 1 : 2, and a substantial improvement of the plugging condition is obtained where said weight ratio is within the range of 2 : 1 to 1 : 1.

It is a feature of the invention that such elimination of plugging difficulties occurs without impairing the rapid reaction rate resulting from the sulfuric acid in the catalyst; in fact, the addition of the phosphoric acid may even increase the polymerization rate due to the additional catalytic action of the phosphoric acid.

In particular, conversion of a substantially pure mixture of 72% paraldehyde and 28% acetaldehyde to the equilibrium mixture of acetaldehyde and paraldehyde can be readily obtained with a residence time in the circulating stream of as little as 25 minutes with the mixed sulfuric-phosphoric catalyst of this invention, the same time as required for the system to reach equilibrium with the sulfuric acid catalyst. With phosphoric acid as the sole catalyst, the conversion of paraldehyde to the equilibrium mixture is only 20% complete after a residence time of 60 minutes and, with a hydrochloric acid catalyst, the conversion to the equilibrium mixture was 50% complete after a residence time of 60 minutes. Results with a trichloroacetic acid catalyst and a hydrobromic acid catalyst were much poorer, as regards conversion, than those obtained with the phosphoric acid catalyst.

In commercial operation, impurities such as water, and ethylene oxide, which may be present in small quantities, retard the rapidity with which the equilibrium mixture is obtained with each of the above catalysts. As a result, only catalysts containing sulfuric acid have been found to produce practical conversion rates for commercial operation.

These considerations define a range of residence time of 25 to 240 minutes under present conditions the shortest time being used, within the range which is required, to obtain an equilibrium mixture in view of the nature and quantity of impurities present in the circulating stream.

In the circulating stream, a mixture of essentially 72 parts of paraldehyde and 38 parts of acetaldehyde is converted to the equilibrium mixture, for example, 82 parts of paraldehyde and 18 parts of acetaldehyde.

For best results, the pressure should vary within the range of 5 to 60 pounds per square inch gauge. In commercial operation, the pressure is close to 45 pounds per square inch gauge. The pressure should be sufficient to maintain reactants in liquid phase.

The polymerized material leaves the reactor 15 through a conduit 16 wherein it is immediately contacted with an excess, such as 150%, of a neutralizing agent which is introduced into the conduit 16 from a tank 17. Suitable neutralizing agents for this purpose are the basic salts or hydroxides of the alkali or alkaline earth metals, such as sodium carbonate, calcium hydroxide, potassium carbonate, potassium hydroxide, and barium hydroxide. An excess of neutralizing agent is used in each case, compared with the quantity required to neutralize the acid present in the reactor effluent.

In the manufacture of 2-methyl-5-ethylpyridine with paraldehyde as a starting material, 2-methyl-5-ethylpyridine can be advantageously utilized as the neutralizing agent, since this is the material formed from the paraldehyde in a subsequent reaction thereof with ammonia.

Another advantageous neutralizing agent is a mixture of sodium acetate and ammonium acetate. Where this material is used, no supplemental addition of 2-methyl-5-ethylpyridine is required to prevent reversion of paraldehyde, as is the case where sodium carbonate is used as the neutralizing agent, and plugging difficulties in or downstream of the neutralizer are eliminated or greatly minimized. Further, salt precipitation in the neutralizer and paraldehyde loss in the aqueous discharge are eliminated or greatly minimized.

The neutralized material passes from conduit 16 to a separator tank 18, the neutralized product leaving the tank through a conduit 19 while heavy materials separated in the tank 18 are withdrawn downwardly through a conduit 20 and fed to a sludge tank 21. Suitable conditions for commercial operation of the separator vessel are a pressure of 40 pounds per square inch gauge and a temperature of 110° F.

The neutralized material withdrawn from conduit 19 is fed to a vaporizer 22 which is heated by a steam coil 23. In the production of paraldehyde, suitable conditions for the vaporizer 22 are a pressure of 32 pounds per square inch gauge and a temperature of 338° F. From the vaporizer, heavy material is discharged through a conduit 24 to the sludge tank 21 while the vaporized material passes through a conduit 25 to a fractionation column 26.

In this column, the polymerized aldehyde is separated from the non-polymerized material, the bottoms product being withdrawn through a line 27 and a cooler 28 to a product storage tank 29. The overhead product from column 26 is withdrawn through a line 31 and passed through a condenser 32 to an overhead accumulator 33. A portion of this top product is fed as reflux to the top of the column through a line 34 while the remainder of the overhead product is passed through a line 35 to the circulating stream, advantageously at a point where the cooler material is introduced into the reaction vessel, as shown. Suitable conditions for operation of the fractionator 26 are a top temperature of 126° F. and a bottom temperature of 323° F.

From the foregoing, it will be evident that we have achieved the objects of our invention in providing a complete system for the polymerization of an aliphatic aldehyde, such as acetaldehyde, with a mixed sulfuric acid-phosphoric acid catalyst which produces a high conversion in a short time without the formation of undesirable gummy materials or plugging of the process lines. Also we have disclosed conditions particularly suitable for the commercial production of paraldehyde with this catalyst.

While the invention has been described in connection with present, preferred embodiments thereof, it is to be understood that this description is illustrative only and is not intended to limit the invention.

We claim:

1. The method of polymerizing an alkyl aldehyde having two to seven carbon atoms which comprises contacting said aldehyde with an acid catalyst composed of sulfuric acid and phosphoric acid, said acids being in the weight ratio of 2 : 1 to 1 : 2.

2. A method of polymerizing an alkyl aldehyde having two to seven carbon atoms which comprises contacting said aldehyde with a catalyst composed of sulfuric acid and phosphoric acid in the weight ratio of 2 : 1 to 1 : 2, said sulfuric acid being present in an amount of 0.05 to 1.0 percent by weight based on said aldehyde, and maintaining the catalyst in contact with the aldehyde for a period of from 25 to 240 minutes at a temperature of 32 to 120° F. and at a pressure sufficient to maintain a liquid phase.

3. The method of polymerizing an alkyl aldehyde having two to seven carbon atoms which comprises contacting said aldehyde with a catalyst composed of sulfuric and phosphoric acids in the weight ratio of 1 : 1 to 1 : 2, and maintaining the catalyst in contact with the aldehyde for a period of 25 to 240 minutes at a temperature of 100 to 120° F. and at a pressure sufficient to maintain a liquid phase.

4. The method of polymerizing acetaldehyde to form paraldehyde which comprises contacting acetaldehyde with a catalyst composed of sulfuric and phosphoric acids in the weight ratio of 1 : 1 to 1 : 2, said sulfuric acid being present in the amount of 0.05 to 0.2% by weight, based on the feed, maintaining the catalyst in contact with said acetaldehyde for a period sufficient to provide an equilibrium mixture at a temperature of 100 to 120° F. and at a pressure sufficient to maintain a liquid phase.

5. The method of polymerizing an alkyl aldehyde having two to seven carbon atoms which comprises circulating a stream of said aldehyde in a path which includes a reactor and a cooler, continuously adding a sufficient amount of a mixed acid catalyst to said stream to maintain a concentration of sufuric acid of 0.05 to 1.0 percent by weight based on the aldehyde, said catalyst being composed of sulfuric acid and phosphoric acid in the weight ratio of 2 : 1 to 1 : 2, continuously withdrawing a portion of said stream, contacting the withdrawn material with an excess of an alkaline neutralizing agent, fractionating the neutralized material to separate it into a polymer-containing portion and a portion composed of unreacted aldehyde, recycling the unreacted aldehyde to the circulating stream, and recovering the polymer-containing portion as a product.

6. The method of polymerizing acetaldehyde which comprises circulating a stream of said acetaldehyde in a path which includes a reactor and a cooler, continuously adding a mixed acid catalyst to said stream, said catalyst being composed of sulfuric acid and phosphoric acid in the ratio of 1 : 1 to 1 : 2, continuously adding acetaldehyde to said stream upstream of the region of catalyst addition, maintaining an acetaldehyde residence time in said stream of 25 to 240 minutes, said sulfuric acid being present in the amount of 0.05 to 0.2% by weight, based on the feed, continuously withdrawing a portion of said stream, contacting the withdrawn material with an excess of an alkaline neutralizing agent, fractionating the neutralized material to separate it into a paraldehyde fraction and an acetaldehyde fraction, recycling the acetaldehyde fraction to the circulating stream, and recovering the paraldehyde fraction as a product.

7. The method of polymerizing acetaldehyde to paraldehyde which comprises contacting acetaldehyde with a catalyst consisting essentially of a mixture of sulfuric acid and phosphoric acid, said acids being in the weight ratio of 2 : 1 to 1 : 2.

References Cited in the file of this patent

UNITED STATES PATENTS

| | | |
|---|---|---|
| 1,300,451 | Morton et al. | Apr. 15, 1919 |
| 2,318,341 | Thompson | May 4, 1943 |
| 2,369,504 | Walker | Feb. 13, 1945 |
| 2,442,942 | Tuerck et al. | June 8, 1948 |
| 2,571,759 | Quinn et al. | Oct. 16, 1951 |

FOREIGN PATENTS

| | | |
|---|---|---|
| 557,447 | Germany | Aug. 23, 1932 |
| 342,668 | Great Britain | Feb. 3, 1931 |